United States Patent [19]

Wang et al.

[11] Patent Number: 4,812,614

[45] Date of Patent: Mar. 14, 1989

[54] MACHINE VISION SEAM TRACKING METHOD AND APPARATUS FOR WELDING ROBOTS

[75] Inventors: Tzay-Chyuan Wang; Cheng-Show Guu, both of Hsin Chu Hsien, Taiwan

[73] Assignee: Industrial Technology Research Institute, Hsin Chu Hsien, Taiwan

[21] Appl. No.: 19,073

[22] Filed: Feb. 26, 1987

[51] Int. Cl.[4] .................................................. B23K 9/12
[52] U.S. Cl. .................................... 219/124.34; 901/42
[58] Field of Search ....................... 219/124.34; 901/42

[56] References Cited

U.S. PATENT DOCUMENTS

| | | | |
|---|---|---|---|
| 4,380,696 | 4/1983 | Masaki | 219/124.34 |
| 4,412,121 | 10/1983 | Kremers et al. | 219/124.34 |
| 4,724,301 | 2/1988 | Shibata et al. | 219/124.34 |

*Primary Examiner*—Clifford C. Shaw
*Attorney, Agent, or Firm*—Cushman, Darby & Cushman

[57] ABSTRACT

The invention relates to a machine vision seam tracking method and apparatus for welding robots, particularly to an apparatus which can automatically detect the deviation between an actual welding seam and a taught path where the apparatus so as to correct the welding path, comprises an image forming means and an image processor. Through the image forming means, a light coming from a common light source, after being condensed and transmitted, can be projected onto a workpiece to form a line of light across the welding seam. A solid state camera disposed along the direction of the welding seam can detect the image of the welding seam which in turn is transmitted to the image processor. The image processor preferably is a microcomputer which comprises software for processing the images respectively formed by the butt, fillet, lap and V-groove joints so as to calculate the deviation, including the positional error across the welding seam as well as the distance variation between the welding torch and the workpiece (the so called height of the welding torch), existing between the actual welding seam and the taught path. A controller of the welding robot can convert the error signals of the welding path into the corresponding data by which the coordinates of the welding robot can be corrected to align with the actual welding seam.

9 Claims, 11 Drawing Sheets

A TYPE

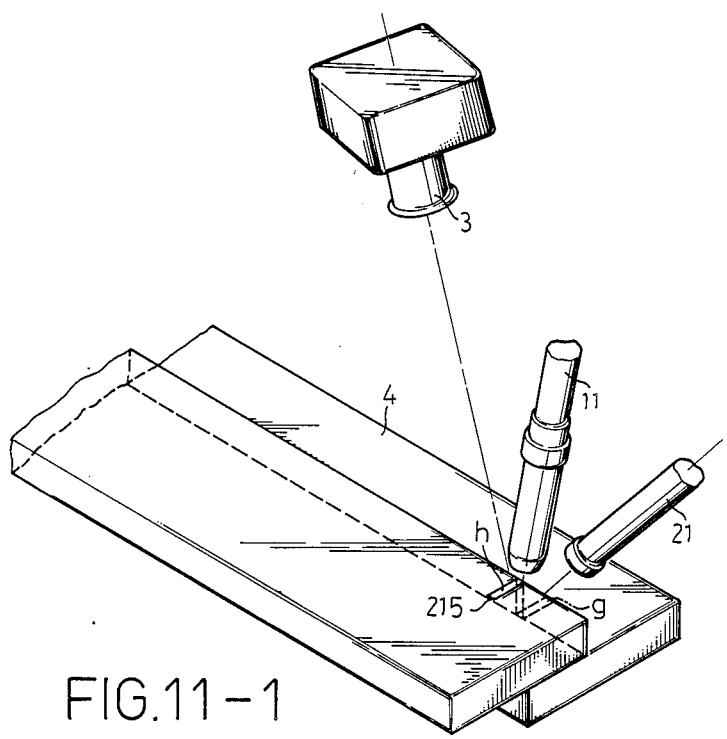
FIG.11-1
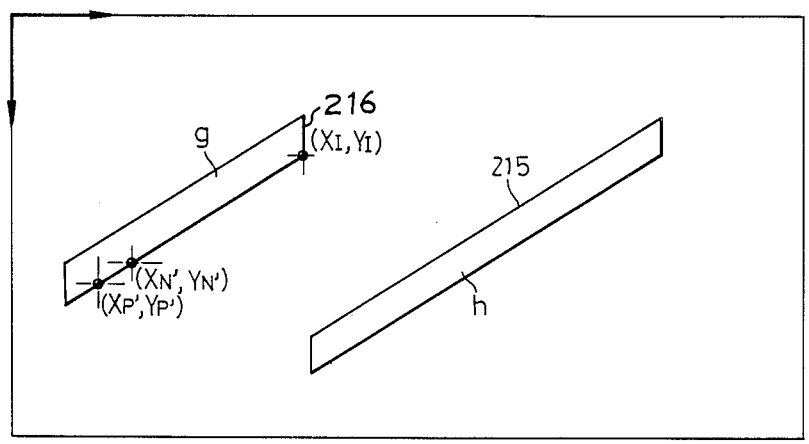
B TYPE FIG.11-2

MACHINE VISION SEAM TRACKING METHOD AND APPARATUS FOR WELDING ROBOTS

BACKGROUND OF THE INVENTION

This invention relates to a machine vision seam tracking method and apparatus for welding robots, and, in particular, to an apparatus which can automatically correct the welding path to adapt to the deviation between the actual welding seam and the taught path caused by the dimensional tolerances of workpieces or positional errors of fixtures so that the taught path can be corrected to align with the actual welding seam.

Recently, welding robots have been widely utilized by people in the welding field. However, conventional welding robots can only follow the taught path to affect the welding operation, thus their functions are limited. In other words, conventional welding robots respond only in accordance to given positional data. Under such circumstances, we have to strictly demand the reproductiveness of the welding robot itself as well as the precise matching between the dimensions of the workpiece and the positioning of the fixture, if we expect the welding robot to function well in the production line. Therefore, the operational cost of the conventional welding robot will be relatively increased.

Accordingly, it is desirable to provide a visual seam tracking apparatus which can be mounted on a welding robot to affect the welding operation with desired precision without increasing the production cost therein.

A vision system utilizing an electronic photographic means has been applied to the tracking of the welding seam. There are two basic types: off-line and on-line. The off-line system involves both seam tracking and information correcting procedures prior to the welding operation. The on-line system ensures that the tracking and welding operations are simultaneous. However, up to now, the known tracking apparatus only utilizes the laser as a light source, which may increase the cost as well as cause a hazard (The direct projection of a laser into the human eye may cause blindness). Further, calibration and maintenance of the laser source also cause inconvenience.

It is, therefore, preferable for us to provide a common light source instead of a laser source to affect the tracking of the welding seam.

SUMMARY OF THE INVENTION

It is the primary object of the present invention to provide a visual seam tracking method and apparatus for welding robots wherein light from a common light source, instead of a laser source, cooperates with optical fibers and then passes through special condensing and projecting means so as to form a line of light on the workpiece across the welding seam for economically affecting the welding operation.

It is another object of the present invention to provide a visual seam tracking method and apparatus for welding robots wherein a projector and a solid state camera are respectively disposed at the opposite sides of a welding torch in such a manner that the projector, the solid state camera and the welding torch are all in the same plane while the angle formed between the axis of the projector and that of the torch is equivalent to the angle formed between the axis of the solid state camera and that of the torch, and the said three axes are intersected at one point right on the welding seam.

It is still another object of the present invention to provide a machine vision seam tracking method and apparatus for welding robots which includes various algorithms for processing the images respectively formed by the butt, fillet, lap and v-groove joints so as to calculate the deviation between the actual welding seam and the taught path in order for automatically correcting the welding path of the welding robot.

Accordingly, a visual seam tracking method and apparatus for welding robots according to the present invention comprises means for projecting a line of light, a solid state camera and an image processor. The image processor preferably is a microcomputer which can be disposed at any desired location in such a manner that one terminal of the microcomputer is connected to the solid state camera. The other terminal is connected to the controller of the welding robot. The microcomputer has various algorithms for processing the images respectively formed by the butt, fillet, lap and V-groove joints. The projector comprises a light condensing assembly fixedly secured to the main body of the robot, a projector adjustably attached to one side of the welding torch of the welding arm and a flexible optical fiber bundle connected between the light condensing assembly and the projector. The solid state camera is disposed at the opposite side of the welding torch in such a manner that the solid state camera, the welding torch and the projector are all in the same plane and the angle formed between the axis of the projector and that of the torch is equal to the angle formed between the axis of the solid state camera and that of the torch, while the said three axes are intersected at one point right on the welding seam of the workpiece. The light condensing assembly properly cooperates with the condenser to condense the light in a small area and then, through the optical fiber bundle, the light can be transmitted to the projector so as to form a line of light on the workpiece across the welding seam. Thus, the solid state camera can detect the welding seam image and transmit it to the image processor to calculate the deviation between the actual welding seam and the taught path by way of suitable image processing software. Accordingly, the controller of the robot is provided with the corrected information, and thereby the welding operation can be affected in accordance with the corrected welding path.

BRIEF DESCRIPTION OF THE DRAWINGS

FIG. 9-1 is a perspective view illustrating the V-groove joint according to the present invention;

FIG. 9-2 is a perspectively view illustration the fillet joint according to the present invention;

FIG. 9-3 is a schematic view showing the algorithm for processing the image formed by the fillet or V-groove joints according to the present invention;

FIG. 10-1 is a perspective view illustrating the A-type lap joint according to the present invention;

FIG. 10-2 is a schematic view showing the algorithm for processing the image formed by the lap joint shown in FIG. 10-1;

FIG. 11-1 is a perspective view illustrating the B-type lap joint according to the present invention; and FIG. 11-2 is a schematic view showing the algorithm for processing the image formed by the lap joint shown in FIG. 11-1.

DETAILED DESCRIPTION OF THE PREFERRED EMBODIMENT

Figure 1:
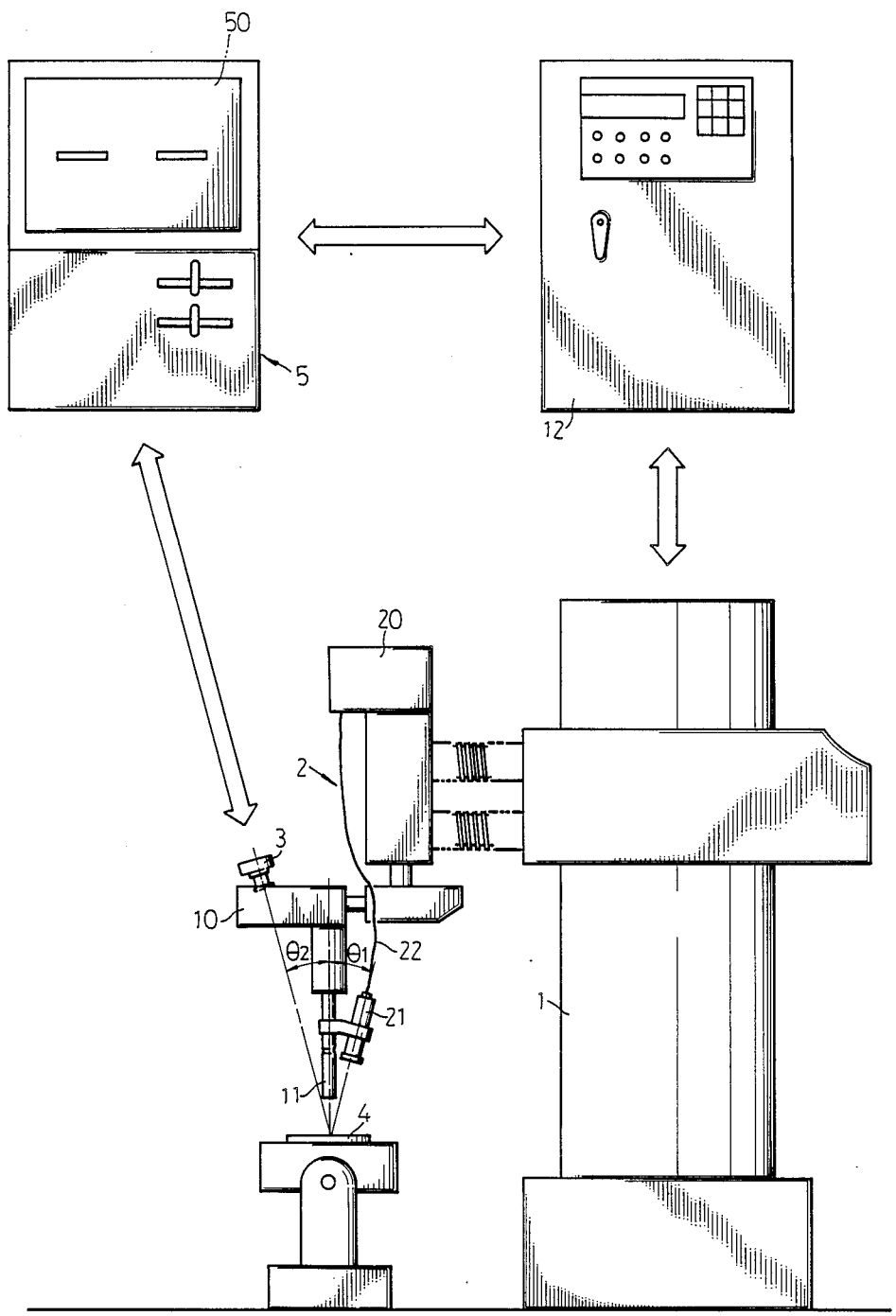
FIG. 1 is a schematic view of the seam tracking system according to the present invention.

Referring to FIG. 1, a preferred embodiment of the present invention comprises the main body(1) of a welding robot, means for projecting a line of light (2), a solid state camera(3), and an image processor(5). The main body(1) has a welding arm(10) to which a weldint torch(11) is fixedly secured. A controller(12), which can be disposed at any desired location, is used to control the main body(1) through wires(not shown). The means for projecting a line of light (2) comprises a light condensing assembly(20) fixedly secured thereto, a projector(21) adjustably mounted on one side of the torch(11) and a flexible optical fiber bundle (22) connected between the assembly(20) and the projector(21). To the opposite side of the torch(11) is fixedly secured a solid state camera(3) in such a manner that the angle $\theta 1$, formed between the axis of the projector(21) and that of the torch(11) is equivalent to the angle $\theta 2$, formed between the axis of the camera (3) and that of the torch(11), while the said three axes are intersected at a single point which is on the workpiece (4) and right beneath the torch(11). The image processor(5) preferably is a microcomputer(50) which can be disposed at any desired location. One terminal of the microcomputer(50) is connected through wires to the solid state camera(3) and the other terminal thereof is connected through wires to the controller(12). Various software is used for processing the images respectively formed by the butt, fillet, lap and V-groove joints.

Figure 2:
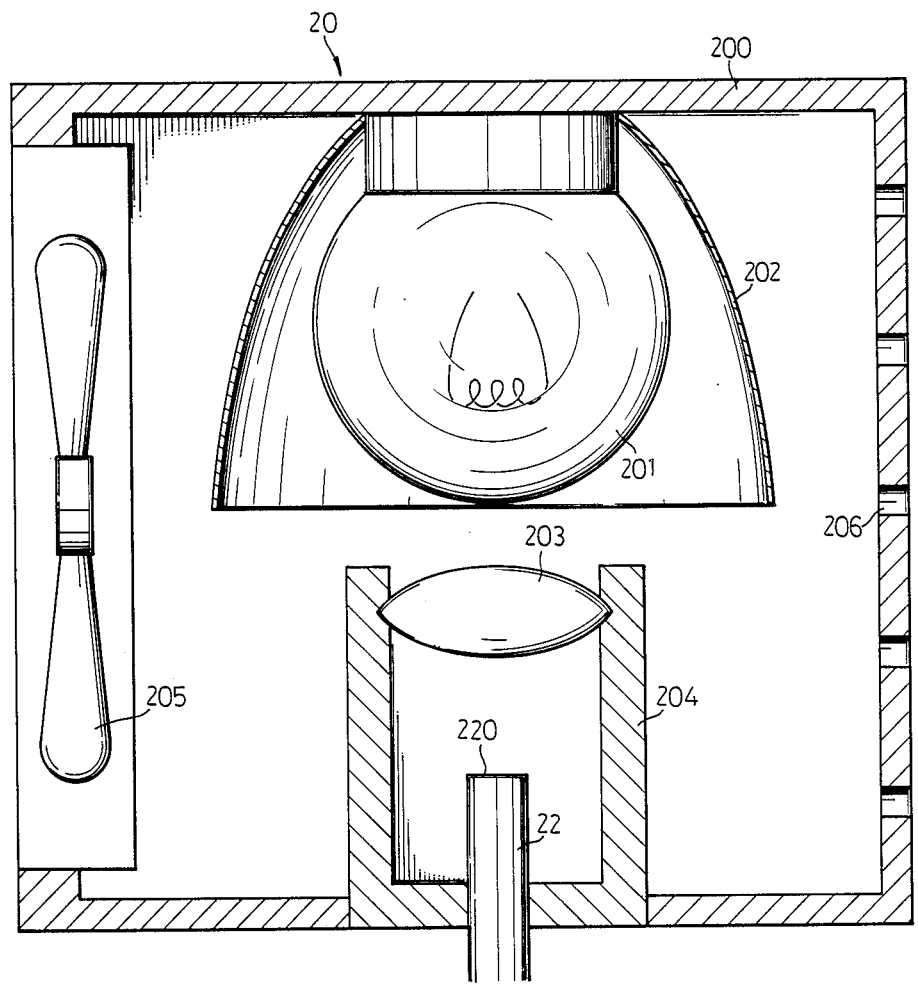
FIG. 2 is a cross-sectional view of the light condensing means according to the present invention.

FIG. 2 illustrates the structure of the light condensing assembly(20). A common light source(201) is disposed at the top edge of the frame(200). A condenser(203), supported by the fixture(204), together with an optical fiber bundle(22) are located beneath the light source(201). The light that comes from the light source(201) can be concentrated on the input end(220) of the optical fiber bundle(22) by means of the suitable combination of the reflective mirror(202) and the condenser(203). The frame(200) is provided at one side with a cooling fan(205) which cooperates with the heat dissipating openings(206) to efficiently dissipate the heat therein.

Figure 3:
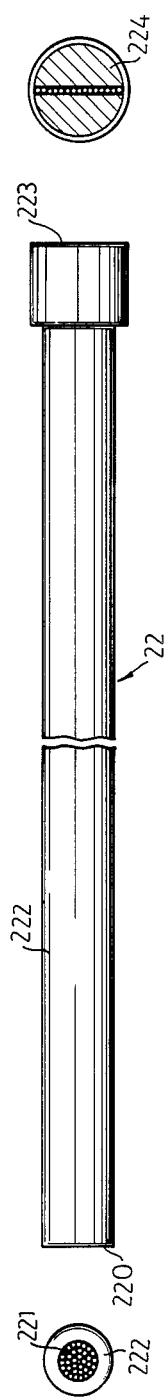
FIG. 3 is a schematic view of the optical fiber bundle according to the present invention.

FIG. 3 shows the structure of the optical fiber bundle(22). The optical fiber bundle(22) consists of a plurality of optical fibers(221) with the flexible cylindrical stainless steel tube(222) surrounding the outer surface thereof. The optical fibers at the input end(220) of the optical fiber bundle(22) are formed into a circular shape while those at the output end (223) thereof are a straight line shape. The interior of the steel tube(222) is filled with the filling material(224) to protect the optical fibers enclosed therein.

Figure 4:
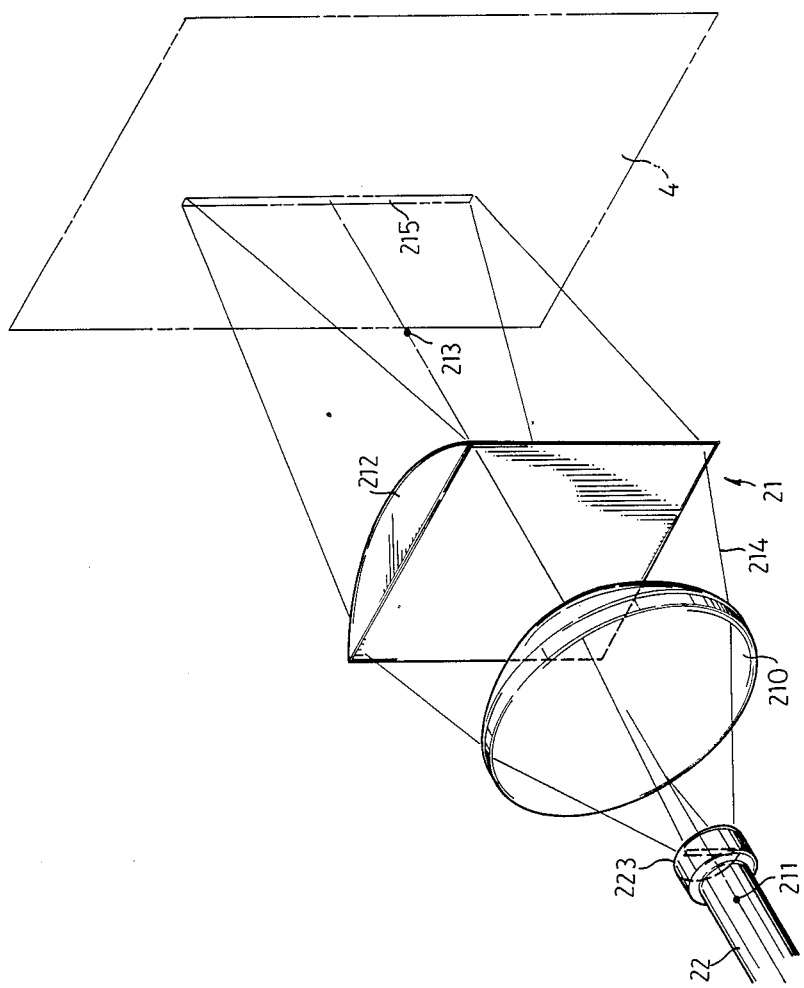
FIG. 4 is a schematic view of the projector according to the present invention.

The projector(21) is illustrated in FIG. 4, wherein the light that comes from the output end(223) of the optical fiber bundle(22) passes through an achromatic concave lens(210) and then through the cylindrical lens(212) to form a line of light(215). The output end(223) thereof is disposed within the focus(211) of the concave lens(210) so that the light column(214) will slightly diverge and pass through the cylindrical lens(212) to form a line of light(215) which is longer than the diameter of the concave lens(210) and is located outside of the focus(213) of the cylindrical lens(212). Through such an arrangement, it is possible to use a concave lens with smaller diameter to obtain the desired light beam with sufficient length, thereby minimizing the size of the projector(21).

Figure 5:
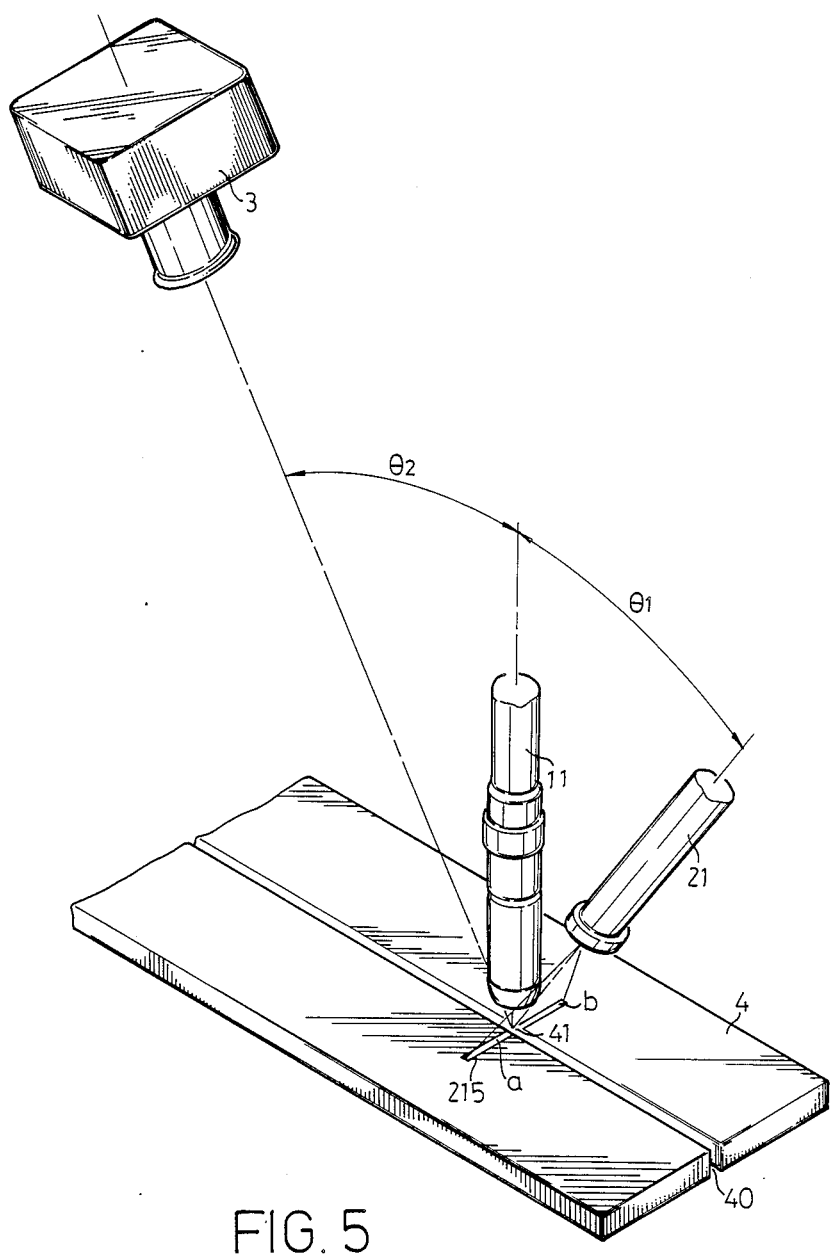
FIG. 5 is a perspective view showing the relative positions among the projector, the welding torch and the solid state camera acording to the present invention.

FIG. 5 which illustrates the relative positions among the projector(21), the welding torch(11) and the solid state camera(3) which are respectively mounted on the welding arm(10) (as shown in FIG. 1). The projector(21) and the solid state camera(3) are respectively disposed at the opposite sides of the welding torch(11) in such a manner that the projector(21), the welding torch(11) and the solid state camera(3) are all in the same plane, and the angle $\theta 1$, formed between the axis of the projector(21) and that of the torch(11), is equal to the angle $\theta 2$, formed between the axis of the solid state camera(3) and that of the torch(11), while the center(41) of the line of light(215) coming from the projector(21) is projected at a certain point which is right on the welding seam beneath the welding torch(11) such that the line of light(215) is perpendicular to the welding seam(40). In other words, the axes of the projector(21), the welding torch(11) and the solid state camera(3) all intersect at the center(41) of the line of light(215), whereby the solid state camera(3) can detect the clear-cut welding seam image whenever the welding torch(11) is perpendicular to the surface of the workpiece(4). Further, such arrangement can facilitate the installation of the projector(21) and the solid state camera(3).

By way of the aforesaid structure, the light which comes from the common light source, after being reflected and condensed, is transmitted through the optical fiber bundle so as to project a line of light, formed by the projector, onto the welding seam of the workpiece. Then, the image information detected by the solid state camera will be transmitted to the image processor for calculating the between the actual welding seam and the taught path and such deviation, in turn, will be sent to the controller of the welding robot to correct the welding path.

Figure 6:
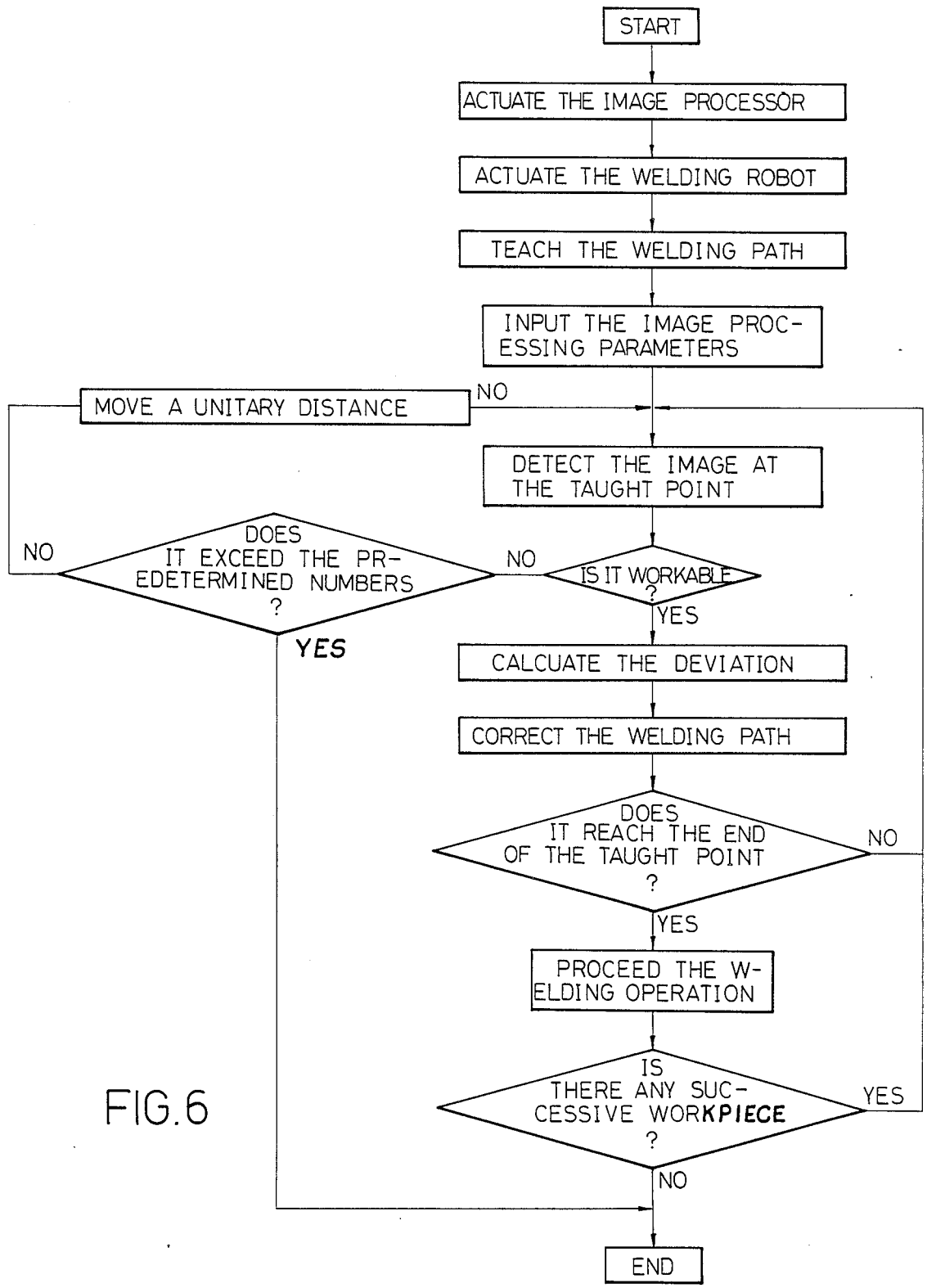
FIG. 6 is a flowchart showing the operational steps of the seam tracking system according to the present invention.

FIG. 6 shows the flowchart of the operating procedures according to the present invention. Firstly, actuate and initialize the image processor and the welding robot. Secondly, teach the welding path, input the image processing parameters, and then move the projector and the solid state camera to the taught point to detect the image of the welding seam. Thirdly, select the corresponding image processing software in accordance with image processing parameters and check whether the detected image can be processed. If the outcome is positive, then calculate the deviation between the actual welding seam and the taught path and correct the welding path. Otherwise, check whether the processing number exceeds a predetermined value and if the outcome is positive, then jump out of the tracking mode; otherwise, move the robot forward or backward one unit in the direction along the welding seam to continue the searching and processing of the image.

Fourthly, repeat the aforesaid procedures to successively track each taught point until the end of the welding path and then proceed with the welding operation by following the corrected welding path. It is noted that the tracking and the welding operations can be intermittently proceeded. Finally, check whether there is a successive workpiece to be welded, and if the outcome is negative, then the welding system will jump into the stand-by mode.

Figure 7:
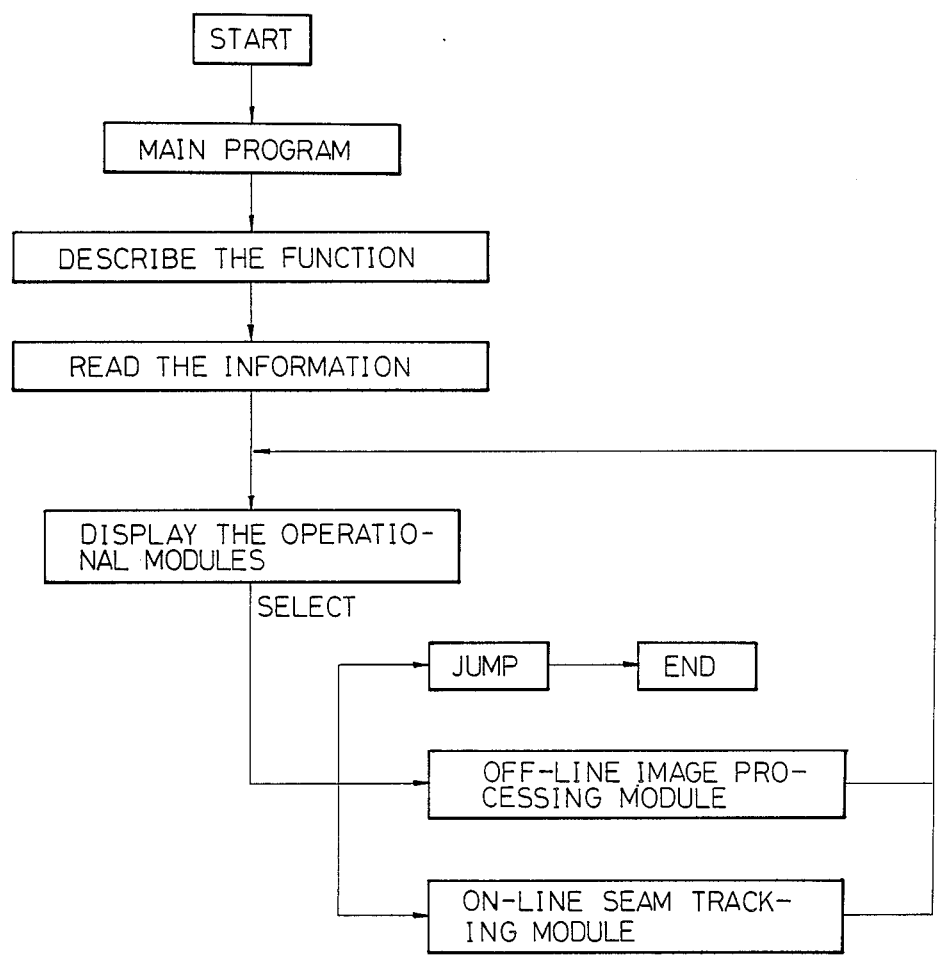
FIG. 7 is a flowchart showing the major program for image processing according to the present invention.

The image processor preferably is a microcomputer(50) which comprises various software programs to be able to analyze and process the image of the welding seam detected by the solid state camera(3). The flowchart of the main program for the image processing is illustrated in FIG. 7. The sequences thereof are described hereinafter.

Firstly, actuate the image processor and load the image processing main program. Secondly, display the functional description(menu) and then read the information concerning the predetermined welding sequences and the exposure time from the disk and then store them into the memory of the image processor. Thirdly, display the operational modules to be selected by the operator wherein said operational modules consist of an on-line seam tracking module, an off-line image processing module and an existing capability for jumping out of the image processing loop.

The on-line seam tracking module is used to cooperate with the actual welding operation of the welding robot in which the functions thereof include the actuation and termination of the system, the read-out and write-in of the application program, and the transmission of the on-line image processing information. The operational flowchart for the aforesaid on-line module is disclosed in FIG. 6 and will not be repeated here. The off-line image processing module is an auxiliary module which is used to adjust the image forming means for ensurance of the image quality and to develop the image processing program. The functions of the off-line module include the setting of various welding joints and the exposure time, the detection of the image, the processsing and calculation of the images respectively formed by the butt, fillet, lap and V-groove joints, the display of the image, the calculation of the image processing period, the paper listing of the image, and the welding seam coordinates.

The algorithms for processing images formed by various welding joints will be described hereinafter.

Figure 8:
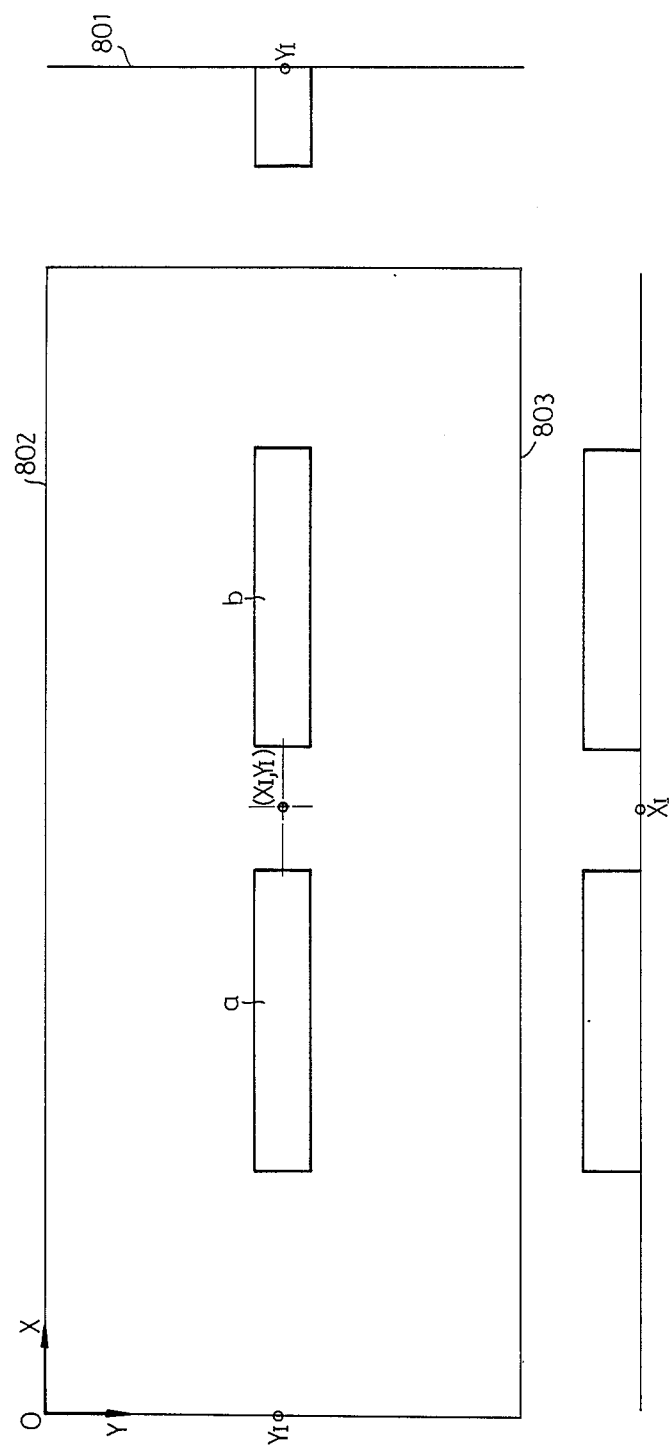
FIG. 8 is a schematic view showing the algorithm for processing the image formed by the butt joint according to the present invention.

Referring to FIGS. 5 and 8, the line of light(215) projected on the butt joint is perpendicular to the welding seam(40) and is divided into two light strips a and b. Such image is detected by the camera(3) and sent to the microcomputer(50) to be analyzed. Referring to FIG. 8, the X-coordinate is perpendicular to the direction along the welding seam(40) while the Y-coordinate is parallel to the direction along the welding seam(40). Firstly, estimate the distribution of the vertical light spots(801) along the Y-coordinate and then choose a certain point YI having the highest spot density. Such procedure will continue to proceed if the point YI can not be found. Secondly, estimate the distribution of the horizontal light spots located within a certain area bounded between two lines(802) and (803) which are parallel to the X-coordinate and perpendicular to YI. Then choose the center of the gap between the two light strips a and b as the point XI. The coordinate(XI,YI) represents the accurate welding position, and the difference between the coordinate(XI,YI) and the preset coordinate(X-O,YO) represents the deviation between the actual welding seam and the taught path.

Figures 1, 9:
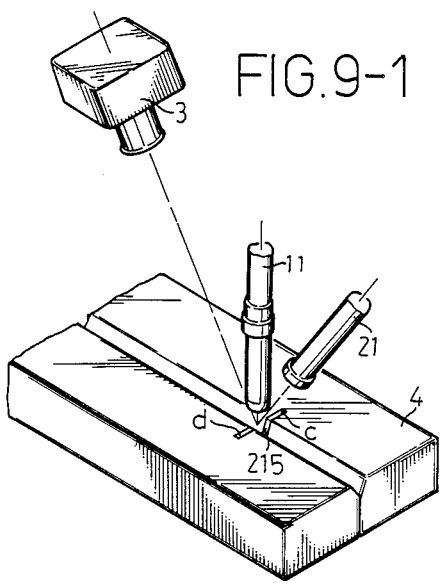
Figures 2, 9:
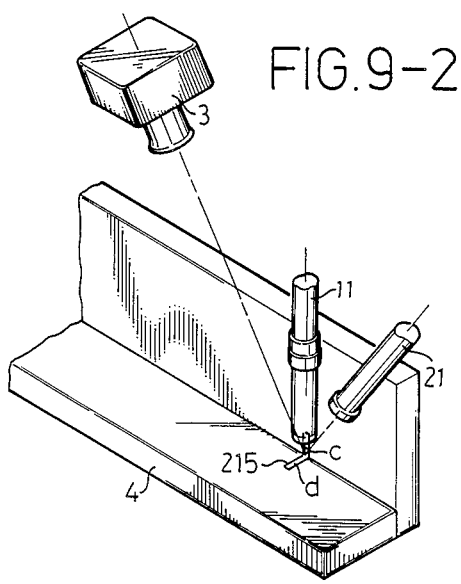
Figures 3, 9:
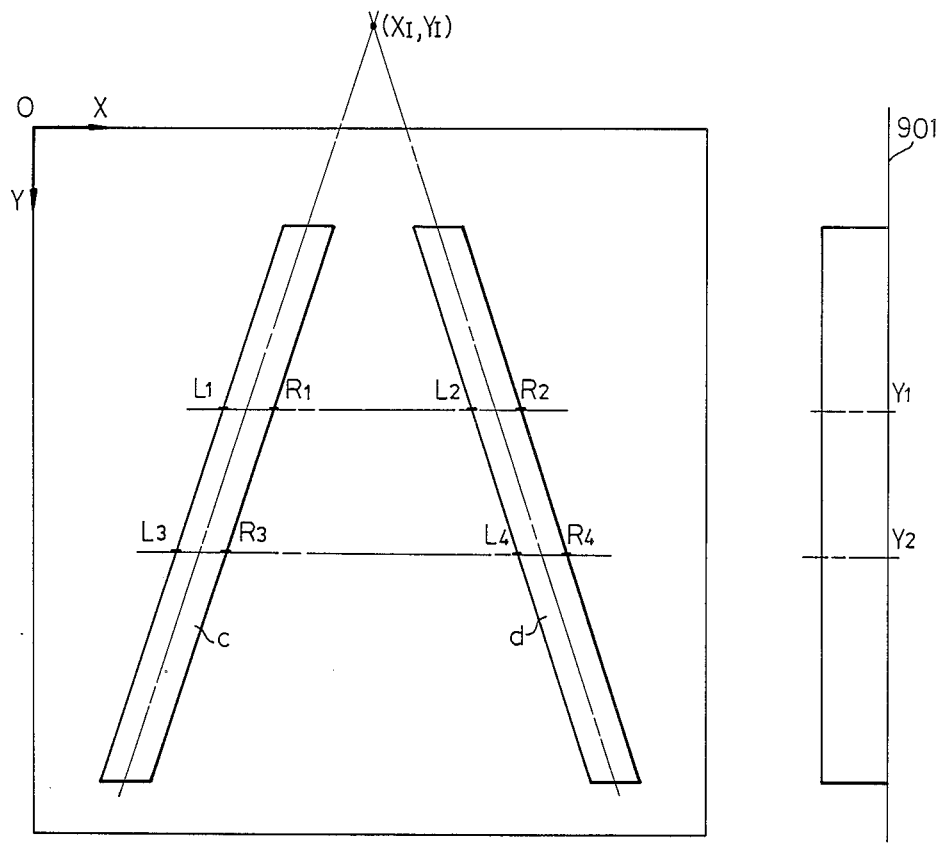

FIGS. 9-1 and 9-2 respectively illustrate the images formed by the V-groove joint and the fillet joint. The line of light(215) on the workpiece(4) forms a V-shaped image consisting of two sloping light strips c and d. The algorithm for processing such an image is shown in FIG. 9-3, wherein the X-coordinate and the Y-coordinate have been defined as those in FIG. 8. Firstly, estimate the distribution of vertical light spots along the Y-coordinate to obtain the light spot area(901). Secondly, choose two lines Y1 and Y2 parallel to the X-coordinate where the lines Y1 and Y2 respectively intersect the light strips c and d at points L1, R1, L2, and R2, and at points L3, R3, L4, and R4, and accordingly obtain the intersecting point(XI, YI) of the said two light strips c and d. The point(XI,YI) represents the accurate welding position to be welded.

Figures 1, 10:
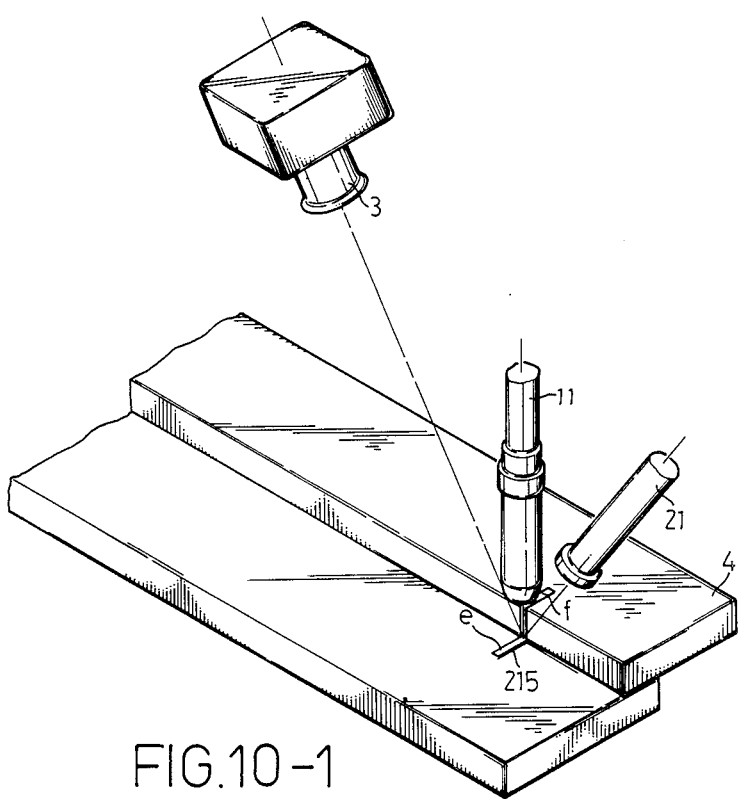
Figures 2, 10:
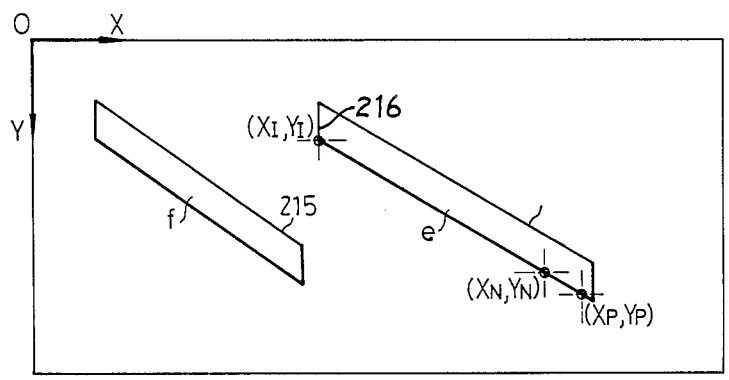

FIGS. 10-1 to 11-2 illustrate the images formed by the lap joints and the algorithms for processing the same, wherein the X-coordinate and Y-coordinate have been defined as those in FIG. 8. The line of light(215) on the workpiece(4) forms two discrete sloping light strips wherein the welding torch(11) disposed at one side of the welding seam(40) is defined as type A and the corresponding light strips are designated as e and f, as shown in FIGS. 10-1 and 10-2, while the welding torch(11), disposed at the other side of the welding seam(40) is defined as type B, and the corresponding light strips are designated as g and h, as shown in FIGS. 11-1 and 11-2. The inner end(216) of the light strip e or g represents the actual welding position.

Since the positional characteristics of type A are different from those of type B, the algorithm for processing the image formed by the lap joint includes the following steps to judge whether the lap joint belongs to type A or type B.

Firstly, starting from the right-hand side of the FIG. 10-2, check whether the leftmost bit of each image memory byte along the Y-coordinate is a light spot. Once a series of light spots are found, then designate such memory byte as the reference point(XP,YP). Secondly, shift leftward to the next byte and repeat the aforesaid procedures to obtain a new byte coordinate(XN,YN). Thirdly, compare YN with YP and if YN is larger than YP, the lap joint is type B, otherwise it is type A.

In type A mode, as shown in FIG. 10-2, the aforesaid procedures will continue to proceed leftward and whenever a new byte coordinate(XN,YN) is found, substitute the new byte coordinate(XN,YN) for the original byte coordinate(XP,YP). Such substitutive procedure will be continued until YN is larger than YP. Then, pick up the last byte coordinate(XP,YP) and choose the leftmost bit coordinate(XI,YI) of the byte coordinate(XP,YP) as the accurate welding position.

In type B mode, as shown in FIG. 11-2, the aforesaid procedures will be shifted to the left-hand side of FIG. 11-2 and continue to proceed rightward to search for the reference point (XP',YP') and for the new byte coordinate(XN',YN'), as stated in type A mode, until YN' is larger than YP'. Then, pick up the last byte coordinate(XP',YP') and choose the rightmost bit coordinate(XI,YI) of the byte coordinate(XP',YP') as the accurate welding position.

The above-mentioned actual welding positions(XI,YI) each calculated from the corresponding image processing are compared with the corresponding standard welding positions (XO,YO) wherein the difference between XI and XO represents the deviation between the actual welding seam and the taught path, while the difference between YI and YO represents the distance variation between the welding torch and the workpiece(4). It is to be understood that each deviation represents the variation of the image bit itself which should be multiplied by a factor to correspond with the practical dimension of the workpiece and then to serve as the corrected data for correcting the welding path. If the deviation exceeds a stated value, the image processing procedures will be repeated. Further, the standard welding position(XO,YO) is set in accordance with the practical calibrating value.

Conclusively, the hardware according to present invention utilizes the combination of the common light source and the optical fibers together with the suitable lens assembly in order to replace the conventional laser light. Further, the software according to the present invention utilizes the image processing microcomputer to analyze and calculate the image detected by the solid state camera to obtain the corresponding accurate welding position for correcting the welding path of the welding robot and to then achieve alignment between the actual welding seam and the welding path. The machine vision seam tracking method and apparatus for welding robots according to the present invention have not only been constructed, but have been proved to possess industrial value.

We claim:

1. A method for operating a machine vision seam tracking apparatus for welding robots having a light projector, a welding torch and electronic photographic means arranged above a workpiece having a welding seam, the method comprising the steps of:
   positioning and maintaining the positions of the light projector, the welding torch and the electronic photographic means such that the projector and the photographic means are disposed at opposite sides of the welding torch and are located above the welding seam, and such that the angle formed between the axes of the projector and the welding torch is equal to the angle formed between the axes of the photographic means and the welding torch, where the axes of the photographic means, the welding torch and the projector intersect at one point on the welding seam and beneath the welding torch;
   projecting onto the workpiece, utilizing the light projector, a line of light perpendicular to the welding seam, said line of light having two light spot segments;
   detecting an image of said welding seam using the electronic photographic means; and
   processing the image with a microcomputer to determine the location of the actual welding seam and detect any deviation between the actual welding seam and a taught welding path for correcting the welding path.

2. A method according to claim 1, wherein said step of processing the image comprises the steps of:
   determining the total distribution of light spots on the image along the welding seam;
   selecting a vertical coordinate on the welding seam at a location having the highest spot intensity;
   determining the distribution of the light spots located within a central area bounded between two parallel lines, said lines disposed on the workpiece and perpendicular to the welding seam; and
   selecting a horizontal coordinate at the center of a gap formed between the two light spot segments within the bounded area.

3. A method according to claim 1, wherein said step of processing the image comprises the steps of:
   determining the distribution area of light spots on the image along the welding seam;
   selecting two parallel lines disposed on the workpiece and perpendicular to the welding seam;
   locating the intersecting points where said two lines intersect the two light spot segments of the line of light; and
   calculating a horizontal and a vertical coordinate where the two light spot segments intersect.

4. A method according to claim 1, wherein said step of processing the image comprises the steps of:
   locating the position of the line of light on the workpiece;
   searching from the right-hand side of the line of light, wherein the right-hand side is determined relative to the image depicted by the camera;
   determining the sloping direction of the line of light;
   selecting a horizontal and a vertical coordinate at the leftmost end of the right-hand light spot segment as the welding seam where said right-hand segment slopes upwardly; and
   selecting a horizontal and a vertical coordinate at the rightmost end of the left-hand light spot segment as the welding seam where said right-hand segment slopes downwardly.

5. A method according to claim 1, further comprising the step of correcting the welding path according to the deviation detected to align with the actual welding seam.

6. An apparatus for machine vision seam tracking for welding robots comprising:
   a main body of a welding robot;
   a welding torch;
   a workpiece located beneath the welding torch, said workpiece having a welding seam therein;
   means for projecting a line of light, including a projector adjustably attached to one side of the welding torch, forming an angle $\theta_1$ between the axis of the projector and the axis of the welding torch, said projector including an achromatic concave lens and a cylindrical lens, said lenses arranged such that a line of light longer than the diameter of the concave lens can be formed on the workpiece perpendicular to the welding seam;
   a solid state camera fixedly secured to the opposite side of the welding torch, forming an angle $\theta_2$ between the axis of the camera and the axes of the welding torch, where $\theta_1$ is equal to $\theta_2$, and wherein the axes of the camera, the welding torch and the projector intersect at a point on the welding seam and beneath the welding torch;
   an image processing means, including a programmed microcomputer connected to the solid state camera, for processing welding seam images formed by butt, fillet, lap and V-groove joints; and
   a controllr connected to said image processing means for correcting a welding path of the welding robot based on the actual welding position as processed by the image processing means.

7. An apparatus according to claim 6, wherein said means for projecting a line of light comprises:

a light condensing assembly fixedly secured to the main body, and an optical fiber bundle connected between the light condensing assembly and the projector.

8. An apparatus according to claim 7, wherein said light condensing assembly includes a frame, a light source mounted on the top edge of the frame, a reflective mirror surrounding the light source, a condenser located beneath the light source, a fixture supporting the condenser, a cooling fan disposed on one side of the frame, and a plurality of heat dissipating openings located on the opposite side of the frame.

9. An apparatus according to claim 7, wherein said optical fiber bundle includes a receiving end and an output end, said receiving end comprising a plurality of optical fibers formed into a circular shape, said output end comprising the optical fibers formed into a straight line shape, said output end being disposed within the focus of the concave lens of the projector, said receiving end being disposed adjacent to the reflective mirror and the condenser.

* * * * *